US009416701B2

(12) United States Patent
Morimoto et al.

(10) Patent No.: US 9,416,701 B2
(45) Date of Patent: Aug. 16, 2016

(54) WORK VEHICLE HAVING EXHAUST APPARATUS

(75) Inventors: Isamu Morimoto, Tondabayashi (JP); Akiyoshi Ono, Izumi (JP); Issei Tanimura, Osaka (JP); Hisashi Tsukatani, Osaka (JP); Mamoru Kawaguchi, Sakai (JE)

(73) Assignee: Kubota Corporation, Osaka (JP)

( * ) Notice: Subject to any disclaimer, the term of this patent is extended or adjusted under 35 U.S.C. 154(b) by 561 days.

(21) Appl. No.: 13/557,460

(22) Filed: Jul. 25, 2012

(65) Prior Publication Data
US 2013/0186077 A1 Jul. 25, 2013

(30) Foreign Application Priority Data

Jul. 29, 2011 (JP) ................................ 2011-166725
Jun. 12, 2012 (JP) ................................ 2012-133126

(51) Int. Cl.
*F01N 3/00* (2006.01)
*B60K 11/06* (2006.01)
*F01N 13/08* (2010.01)
*E02F 9/08* (2006.01)

(52) U.S. Cl.
CPC . *F01N 3/00* (2013.01); *B60K 11/06* (2013.01); *F01N 13/08* (2013.01); *F01N 13/082* (2013.01); *E02F 9/0866* (2013.01); *F01N 2340/04* (2013.01); *F01N 2470/30* (2013.01); *F01N 2590/08* (2013.01)

(58) Field of Classification Search
CPC ... F01N 13/08; F01N 13/082; F01N 2590/17; F01N 2590/08; F01N 13/1822

USPC ..................................................... 60/295, 299
See application file for complete search history.

(56) References Cited

U.S. PATENT DOCUMENTS

| 4,020,915 | A | * | 5/1977 | Darnell et al. ................. 180/309 |
| 5,466,900 | A | * | 11/1995 | Knapp ........................... 181/227 |
| 7,007,720 | B1 | * | 3/2006 | Chase et al. ................... 138/110 |
| 7,475,750 | B2 | * | 1/2009 | Tokuhara ..................... 180/69.2 |
| 8,991,162 | B2 | | 3/2015 | Kosaka et al. |
| 2009/0090101 | A1 | * | 4/2009 | Kim ................................. 60/324 |
| 2010/0186394 | A1 | * | 7/2010 | Harrison et al. ................ 60/299 |
| 2011/0154810 | A1 | * | 6/2011 | Mitsuda .................... E02F 9/00 60/311 |

FOREIGN PATENT DOCUMENTS

| EP | 2345802 A2 | 7/2011 |
| JP | 50-025214 U | 3/1975 |
| JP | 62-31518 A | 2/1987 |
| JP | 2003-239719 A | 8/2003 |

(Continued)

*Primary Examiner* — Kenneth Bomberg
*Assistant Examiner* — Anthony Ayala Delgado
(74) *Attorney, Agent, or Firm* — The Webb Law Firm

(57) ABSTRACT

An exhaust gas purifying device is disposed in a portion of a motor section rearwardly of a vehicle body. A cylindrical mixing exhaust pipe is provided in a distal end portion of an exhaust pipe, through which exhaust gas discharged from the exhaust gas purifying device flows. The mixing exhaust pipe has a larger diameter than the exhaust pipe to overlap the exhaust pipe in a radial direction for drawing ambient air by the exhaust gas discharged from the exhaust pipe and mixing drawn air with the exhaust gas to discharge the mixed gas to the outside from a discharge opening. The mixing exhaust pipe is arranged in a lower side position of the motor section on one side of the vehicle width direction with the exhaust gas being discharged toward the front of the vehicle body.

15 Claims, 10 Drawing Sheets

(56) References Cited

FOREIGN PATENT DOCUMENTS

| JP | 2008-31955 A | 2/2008 |
| JP | 2010116001 A | 5/2010 |
| JP | 2010-195339 A | 9/2010 |
| JP | 2011-135846 A | 7/2011 |
| KR | 10-2007-0009237 A | 1/2007 |

\* cited by examiner

WORK VEHICLE HAVING EXHAUST APPARATUS

TECHNICAL FIELD

The present invention relates to a work vehicle having an exhaust apparatus.

BACKGROUND ART

In a conventional example of the work vehicle as noted above, exhaust gas emitted from an exhaust gas purifying device is guided to a high position through a vertically elongated pipe element along a front frame of a cabin covering a driver's section to be discharged straight to the outside through an upper end opening of the pipe element (see Japanese Unexamined Patent Application Publication No. 2010-116001, for example).

The exhaust gas purifying device is used for capturing and removing particulate matter such as soot contained in the exhaust gas. In order to prevent a decline in capturing function due to accumulation of the captured particulate matter, such an exhaust gas purifying device is adapted to perform regeneration processing for heating captured particulate matter by a heating device such as a heater, for example, and then burning and removing the particulate matter. As a result, the temperature of the exhaust gas discharged in the regeneration processing is higher than that of regular exhaust gas.

In the conventional arrangement described above in which the cabin is provided on the driver's section, the operator present within the cabin would not receive any influence of the exhaust gas even if the exhaust gas is discharged straight to the outside through the upper end opening of the pipe element. However, an assistant worker present near the work vehicle may be adversely affected by the high-temperature exhaust gas.

Further, if the work vehicle is not provided with the cabin, not only the assistant worker but also the operator in the driver's section may receive a harmful influence from the high-temperature exhaust gas.

Thus, in the conventional arrangement, while soot or the like contained in the exhaust gas is removed through the exhaust gas purifying device, the high-temperature exhaust gas emitted from the exhaust gas purifying device is discharged straight to the outside through the upper end opening of the pipe element, which disadvantageously deteriorates a working environment due to the high-temperature exhaust gas.

The object of the present invention is to provide a work vehicle capable of preventing deterioration of a working environment caused by high-temperature exhaust gas while providing an exhaust gas purifying device for purifying the exhaust gas.

SUMMARY OF INVENTION

A work vehicle according to the present invention includes a motor section positioned forwardly of a driver's section in a vehicle body, and an exhaust apparatus. The exhaust apparatus includes an exhaust gas purifying device mounted on the motor section for purifying exhaust gas of an engine, an exhaust pipe, through which the exhaust gas discharged from the exhaust gas purifying device flows, and a mixing exhaust pipe for drawing ambient air by the exhaust gas emitted from the exhaust pipe, mixing the exhaust gas with drawn ambient air, and discharging the mixed gas to the outside from a discharge opening.

The exhaust gas purifying device is disposed in a portion of the motor section rearwardly of the vehicle body.

The mixing exhaust pipe is formed as a tube larger than the exhaust pipe in diameter with overlapping a distal end portion of the exhaust pipe in a radial direction.

The mixing exhaust pipe is arranged in a lower side position of the motor section on one side of a vehicle width direction with its axis extending along a longitudinal direction of the vehicle body and with the exhaust gas being discharged toward the front of the vehicle body.

In the work vehicle as noted above, it is preferable that the exhaust pipe is connected to an end portion of the exhaust gas purifying device on the other side of the vehicle width direction to extend toward the one side of the vehicle width direction and overlap the mixing exhaust pipe in the radial direction.

In the work vehicle as noted above, it is preferable that an air drawing opening is formed in a portion of the mixing exhaust pipe that is a downstream side of the position where the mixing exhaust pipe overlaps the exhaust pipe and an upstream side of the discharge opening in the gas flowing direction, for drawing ambient air through the exhaust gas flowing the exhaust pipe, and the discharge opening has a sectional area larger than a total sectional area of a sectional area of an air intake formed in a portion where an extreme end of the exhaust pipe overlaps an extreme end of the mixing exhaust pipe and a sectional area of the air drawing opening.

In the work vehicle as noted above, it is preferable that the mixing exhaust pipe is disposed above a front axle case for supporting steerable front wheels.

In the work vehicle as noted above, it is preferable that a throttle portion is provided in a front end portion of the exhaust pipe, the throttle portion having a vertically elongated section having a width smaller than a width in the width direction in an upstream portion in the gas flowing direction.

In the work vehicle as noted above, it is preferable that the mixing exhaust pipe is disposed forwardly of steerable front wheels.

In the work vehicle as noted above, it is preferable that the mixing exhaust pipe is adapted to discharge the exhaust gas obliquely downward in an outer side with respect to the vehicle width direction in a forward portion of the vehicle body.

DESCRIPTION OF EMBODIMENTS

First Embodiment

An embodiment of the present invention in which an exhaust apparatus for a work vehicle according to the present invention is applied to a tractor acting as the work vehicle will be described hereinafter in reference to the accompanying drawings.

Figure 1:
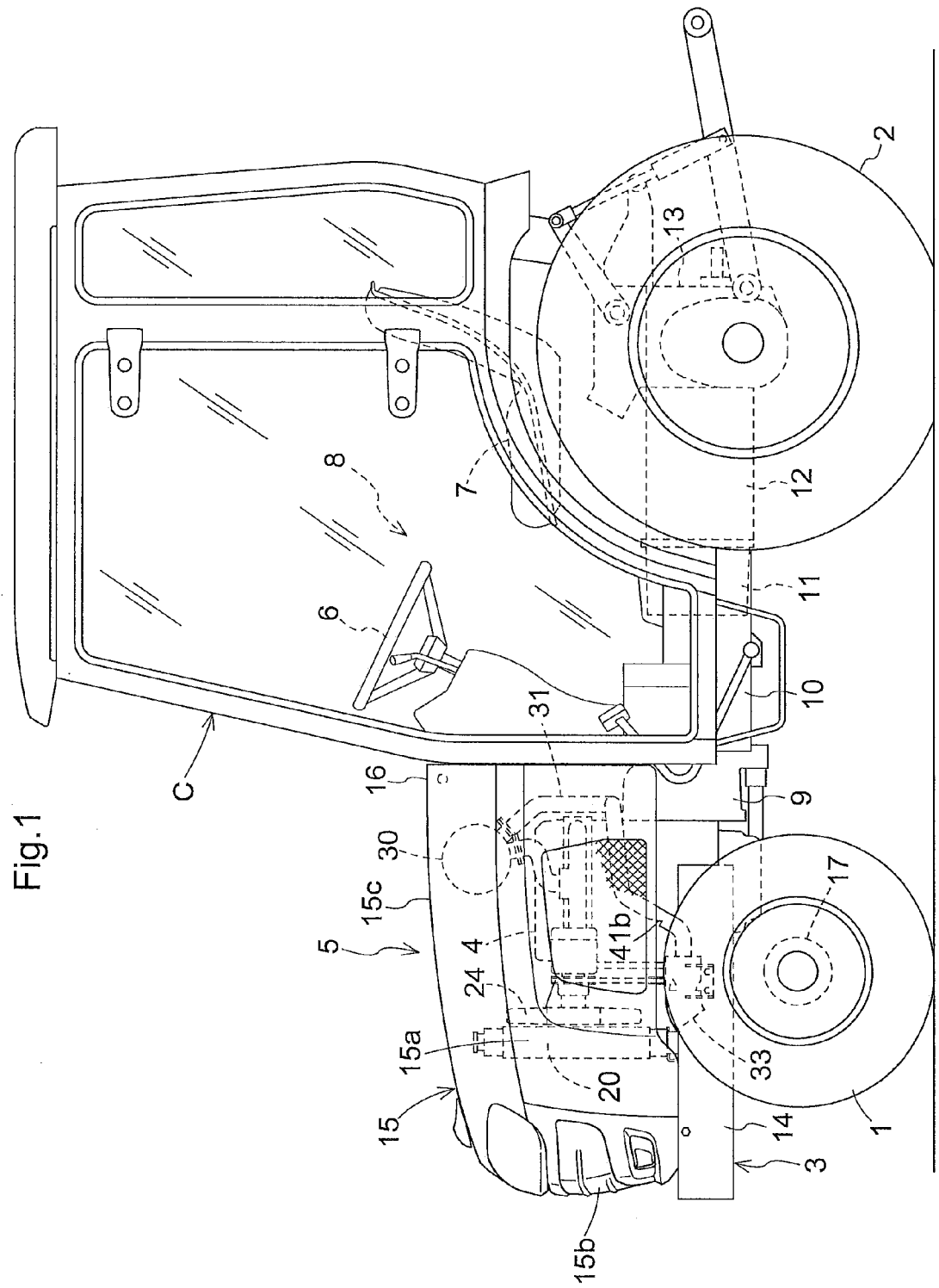
FIG. 1 is an overall side view of a tractor.

As shown in FIG. 1, the tractor is a four-wheel drive vehicle including a pair of right and left steerable drive front wheels 1 and a pair of right and left drive rear wheels 2, both of which are provided in a traveling vehicle body 3. A motor section 5 provided with an engine 4 and the like is mounted forwardly of the traveling vehicle body 3, and a driver's section 8 provided with a steering wheel 6, a driver's seat 7 and the like is mounted rearwardly of the traveling vehicle body 3. Further, the tractor includes a cabin C on the driver's section 8.

In a rear portion of the engine 4, a clutch housing 9, a housing frame 10 made of sheet metal, a main speed-change device 11 including a hydrostatic (HST) stepless speed-change device, a transmission case 12, and a differential case 13 are serially connected in a line. The right and left rear wheels 2 are supported to the differential case 13. A front frame 14 extends forwardly from the underside of the engine 4, and a front axle case 17 for mounting the front wheels 1 is supported to the front frame 14.

A hood 15 covering the motor section 5 includes right and left side covers 15a, a ventilatable front cover 15b, and a top cover 15c provided with a headlight. While the side covers 15a and the front cover 15b are fixedly supported to the front frame 14 and a center frame 16, the top cover 15c is supported to be pivotable to open upward.

Figure 2:
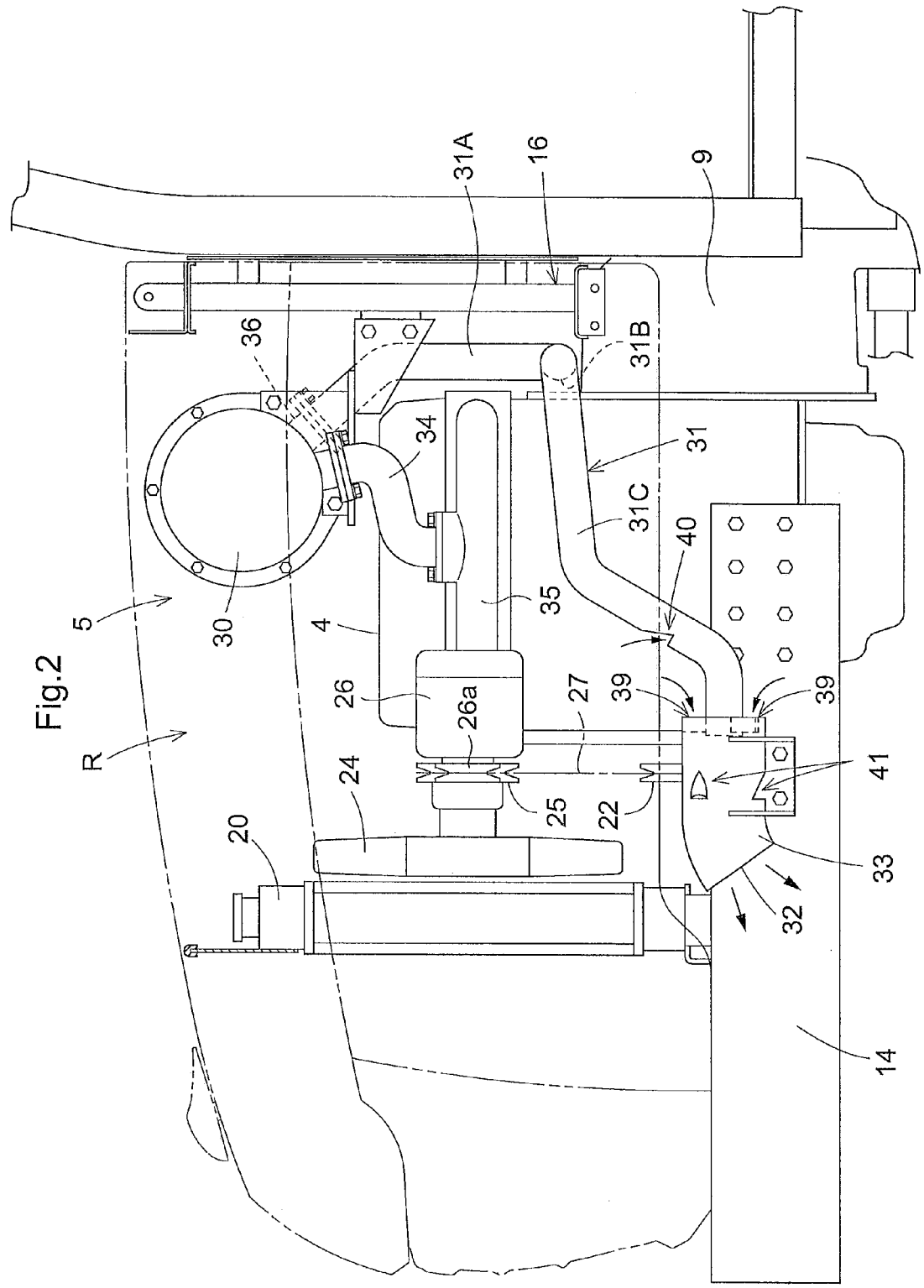
FIG. 2 is a side view of a motor section.
Figure 3:
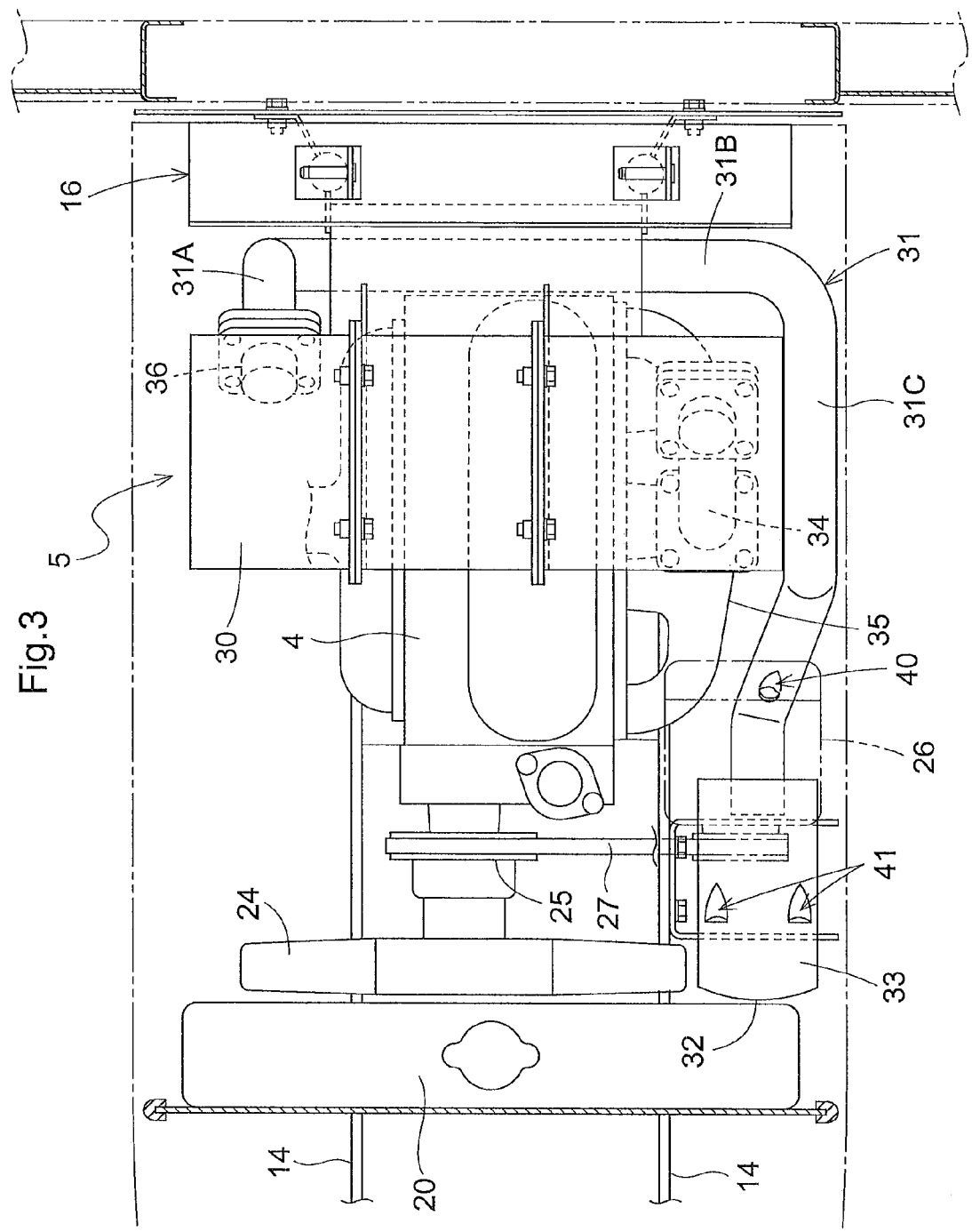
FIG. 3 is a top plan view of the motor section.

As shown in FIGS. 2 and 3, the engine 4 is an air-cooled vertical diesel engine. A radiator 20 is arranged to stand upright in a portion forwardly of the engine to allow cooling water of the engine 4 to flow circulatively between a cooling water jacket (not shown) arranged within the engine 4 and the radiator 20. A transmission belt 27 is tensionally wound around over a pulley 22 mounted on an output shaft (not shown) provided in a front lower portion of the engine 4, an input pulley 25 for a cooling fan 24 supported to a front upper portion of the engine 4, and an input pulley 26a for an electric generator 26. The cooling fan 24 is adapted to supply ambient air introduced into an engine room R through the front cover 15b to the radiator 20.

An exhaust gas purifying device 30 is provided in the motor section 5 for purifying exhaust gas of the engine 4. The exhaust gas purifying device 30 includes a diesel particulate filter (DPF) for capturing and removing particulate matter containing carbon present in the exhaust gas as a major component. Although not shown, the exhaust gas purifying device 30 is adapted to perform regeneration processing for heating captured particulate matter by a heating device such as a heater, for example, and then burning and removing the particulate matter in order to prevent a decline in capturing function due to accumulation of the captured particulate matter. As a result, the temperature of the exhaust gas discharged in the regeneration processing is higher than that of the exhaust gas of a general engine regardless of the rotational speed of the engine 4.

In view of the above, the tractor according to the current embodiment provides an arrangement in which the exhaust gas emitted from the exhaust gas purifying device 30 is discharged to the outside with its temperature being lowered.

More particularly, in a distal end portion of an exhaust pipe 31, through which the exhaust gas discharged from the exhaust gas purifying device 30 flows, is provided a cylindrical mixing exhaust pipe 33 having a larger diameter than the exhaust pipe 31 to overlap the pipe 31 in a radial direction for drawing ambient air by the exhaust gas discharged from the exhaust pipe 31 and mixing drawn air with the exhaust gas to discharge the mixed gas to the outside from a discharge opening 32. The mixing exhaust pipe 33 is arranged in a lower side position of the motor section 5 on the left side in a vehicle width direction as one side of the vehicle width direction with its axis extending along a longitudinal direction of the vehicle body and with the exhaust gas being discharged toward the front of the vehicle body. This allows the exhaust gas emitted from the exhaust gas purifying device 30 to flow through the exhaust pipe 31 and be discharged from the distal end portion of the pipe 31. Then, the mixing exhaust pipe 33 is adapted to draw ambient air by the exhaust gas discharged from the exhaust pipe 31 and mixing the drawn air with the exhaust gas to discharge the mixed gas to the outside from the discharge opening 32. Since the mixing exhaust pipe 33 is cylindrical, mixing of the exhaust gas with ambient air is promoted to allow the mixed gas to be discharged to the outside from the discharge opening 32 with its temperature being considerably lowered, compared with when discharged from the exhaust gas purifying device 30. Since the mixing exhaust pipe 33 is provided in the lower side position of the motor section 5 on the left side in the vehicle width direction as one side of the vehicle width direction with its axis extending along the longitudinal direction of the vehicle body and with the exhaust gas being discharged toward the front of the vehicle body, it is less possible to put restrictions on the arrangements of other elements mounted within the motor section 5. In addition, the exhaust gas to be discharged is emitted in a direction away from the driver's section 8, and thus the operator is less affected by the exhaust gas. As a result, it is possible to avoid deterioration in the working environment originated from high-temperature exhaust gas, while purifying the exhaust gas using the exhaust gas purifying device 30.

Further, the exhaust pipe 31 is connected to the right side end portion of the exhaust gas purifying device 30 as the other side of the vehicle width direction and extends toward the left side in the vehicle width direction to overlap the mixing exhaust pipe 33 in the radial direction. Since the exhaust pipe 31 extends long from the end portion on the other side of the vehicle width direction to the one side of the vehicle width direction in this manner, the high-temperature exhaust gas discharged from the exhaust gas purifying device 30 flows through the elongated exhaust pipe 31 to release heat to the outside through the exhaust pipe 31, thereby to lower the temperature of the exhaust gas. More particularly, it is possible to lower the temperature of the exhaust gas, making efficient use of the exhaust pipe 31 long extending for connecting the exhaust gas purifying device 30 to the mixing exhaust pipe 33.

A specific arrangement will be described hereinafter in reference to FIGS. 2 to 4.

As shown in FIG. 2, the exhaust gas purifying device 30 is mounted in the rear side position of the motor section 5 above the engine 4.

The exhaust gas purifying device 30 has a cylindrical shape elongated in an axial direction and is provided above the engine 4 with the axial direction being aligned with the vehicle width direction. A gas introducing pipe 34 is mounted on an end portion of the exhaust gas purifying device 30 on the left side of the vehicle width direction to communicate with an exhaust manifold 35 provided on the left side of the engine 4 through flange connection.

Figure 4:
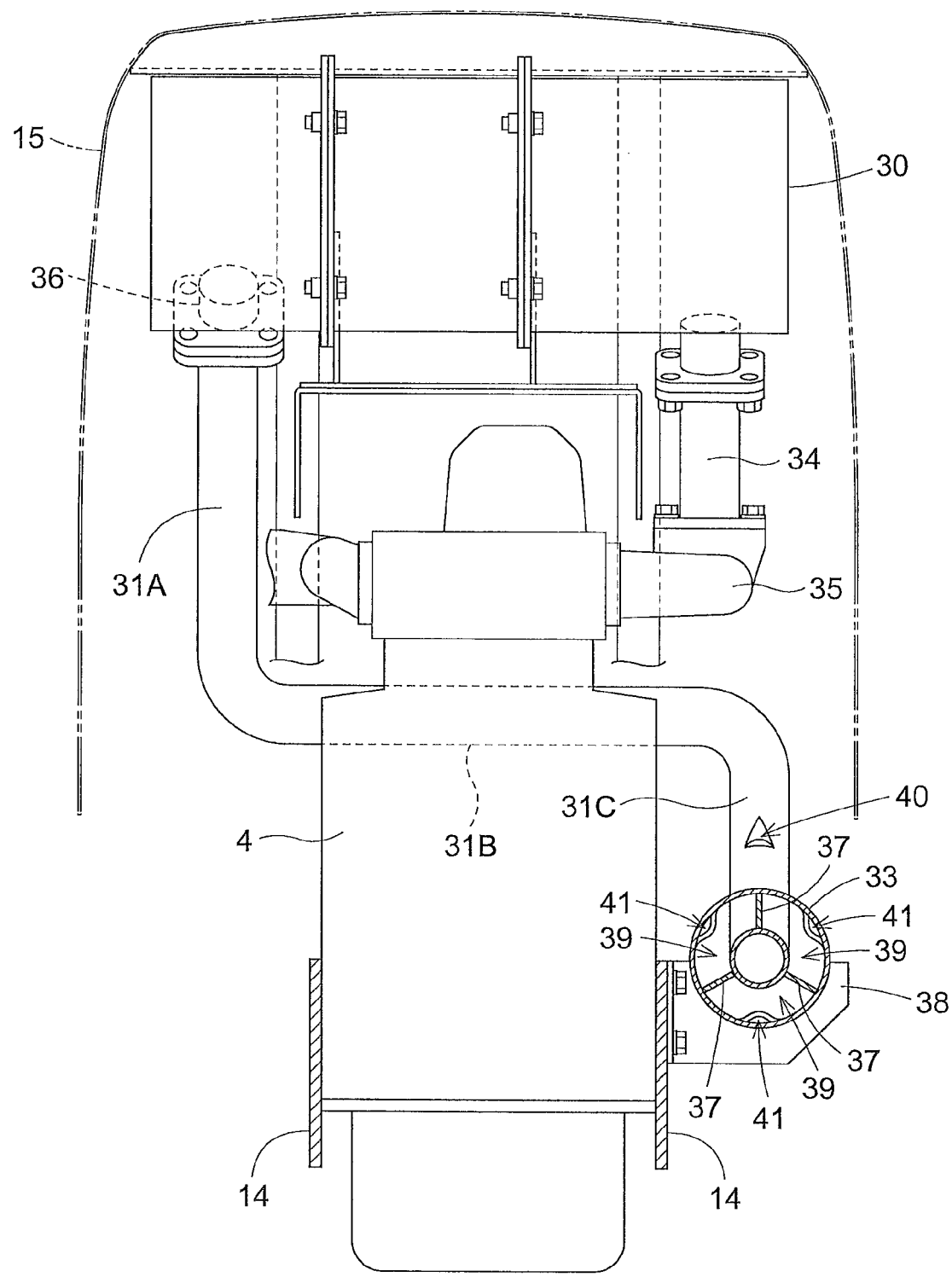
FIG. 4 is a front view of the motor section.

As shown in FIGS. 3 and 4, the exhaust pipe 31 is connected at an upstream end portion in a gas flowing direction to a gas discharge pipe 36 provided in an end portion of the exhaust gas purifying device 30 on the right side in the vehicle width direction through flange connection. The exhaust pipe 31 includes a downward extending portion 31A extending downward from a connecting point to the gas discharge pipe 36, a transversely extending portion 31B bent from a lower end portion of the downward extending portion 31A like a C-shape toward the left side in the vehicle width direction, and a longitudinally extending portion 31C bent from an end portion of the transversely extending portion 31B on the left side of the vehicle width direction like a C-shape and extending forward and downward of the vehicle body.

As shown in FIGS. 2 and 3, the mixing exhaust pipe 33 is provided in a front end portion (distal end portion) of the longitudinally extending portion 31C in the exhaust pipe 31 to overlap the pipe 31 in the radial direction. The mixing exhaust pipe 33 is cylindrical and has a larger diameter than the exhaust pipe 31 and provided in the lower side position of the motor section 5 in the vehicle width direction with its axis extending along the longitudinal direction of the vehicle body and with the exhaust gas being discharged toward the front of the vehicle body.

A rear end portion of the mixing exhaust pipe 33, that is, an upstream end portion in the gas flowing direction, is wide open entirely to allow the exhaust pipe 31 to fit into and overlap the opening in the radial direction. On the other hand, the front end portion of the mixing exhaust pipe 33, that is, the downstream end portion in the gas flowing direction, is also wide open entirely to form the discharge opening 32 for discharging the exhaust gas forward and outward.

In a position where the mixing exhaust pipe 33 overlaps the exhaust pipe 31, those pipes are fixedly connected to each other through connecting stays 37 spaced apart from each other in a circumferential direction. Further, the mixing exhaust pipe 33 is fixedly connected and supported to a lateral side portion of the front frame 14 through a support stay 38 connected to an outer peripheral side of the pipe 33.

In the position where the mixing exhaust pipe 33 overlaps the exhaust pipe 31, there is a space defined between the adjacent connecting stays 37 to provide an air intake 39 for taking in ambient air through the space formed between the exhaust pipe 31 and the mixing exhaust pipe 33. Such an air intake 39 allows ambient air to be drawn by an ejector effect when the exhaust gas is forcefully emitted from the distal end portion of the exhaust pipe 31.

The mixing exhaust pipe 33 is positioned laterally of the front frame 14 above the front axle case 17. As a result, even if the front wheels 1 are steered to a great extent up to a maximum steering angle, the mixing exhaust pipe 33 is prevented from interfering with the front wheels 1 and damaging. Thus, the mixing exhaust pipe 33 can be used satisfactorily over a long period of time.

In a portion of the exhaust pipe 31 that is an upstream side of the position in the gas flowing direction where the mixing exhaust pipe 33 overlaps the exhaust pipe 31 is formed an upstream air intake 40 for drawing ambient air through exhaust gas flowing the exhaust pipe 31.

Figure 5:
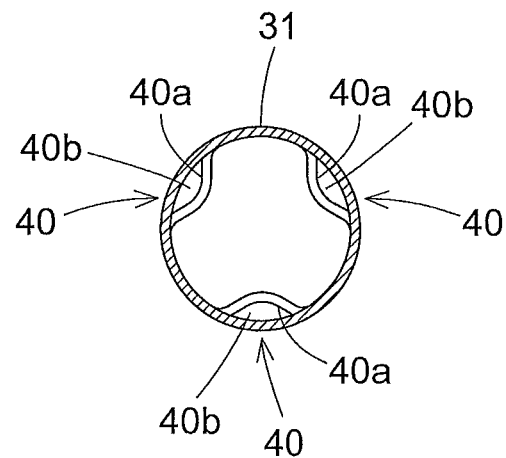
FIG. 5 is a sectional view of an upstream air intake.
Figure 6:
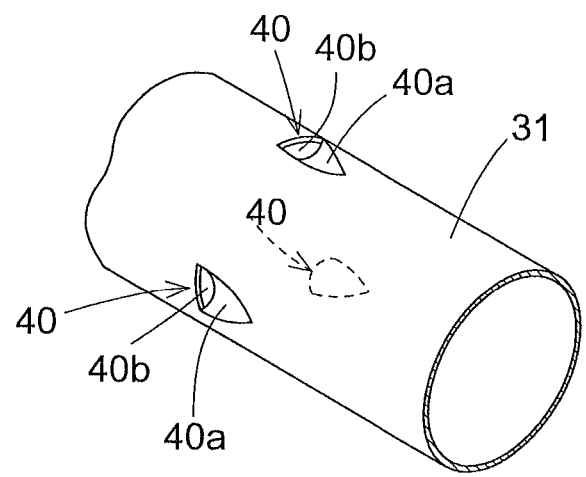
FIG. 6 is a perspective view of the upstream air intake.

More particularly, as shown in FIGS. 5 and 6, a cutout portion is formed in part of the exhaust pipe 31 in the circumferential direction. Then, a circumferential wall portion of the pipe 31 in a position that is upstream of the cutout portion in the gas flowing direction is dented inwardly of the pipe, thereby to form a guide wall portion 40a. An upstream air drawing opening 40b is formed between a downstream end portion of the recessed guide wall portion 40a in the gas flowing direction and an arc circumferential wall of the exhaust pipe 31, thereby to provide the upstream air intake 40. Three upstream air intakes 40 are equidistantly formed in the circumferential direction.

Further, a downstream air intake 41 is formed in a portion of the mixing exhaust pipe 33 that is a downstream side of the position where the mixing exhaust pipe 33 overlaps the exhaust pipe 31 and an upstream side of the discharge opening 32 in the gas flowing direction, for drawing ambient air through the exhaust gas flowing the exhaust pipe 31.

Figure 7:
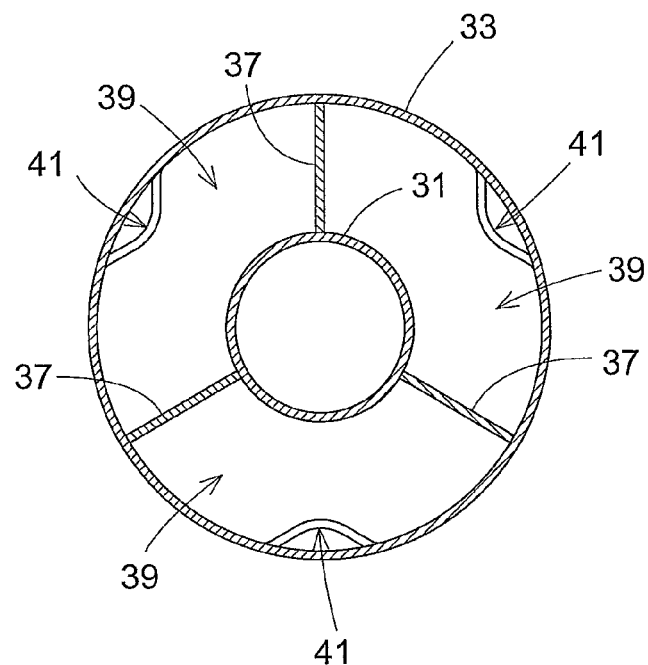
FIG. 7 is a sectional view of a mixing exhaust pipe.
Figure 8:
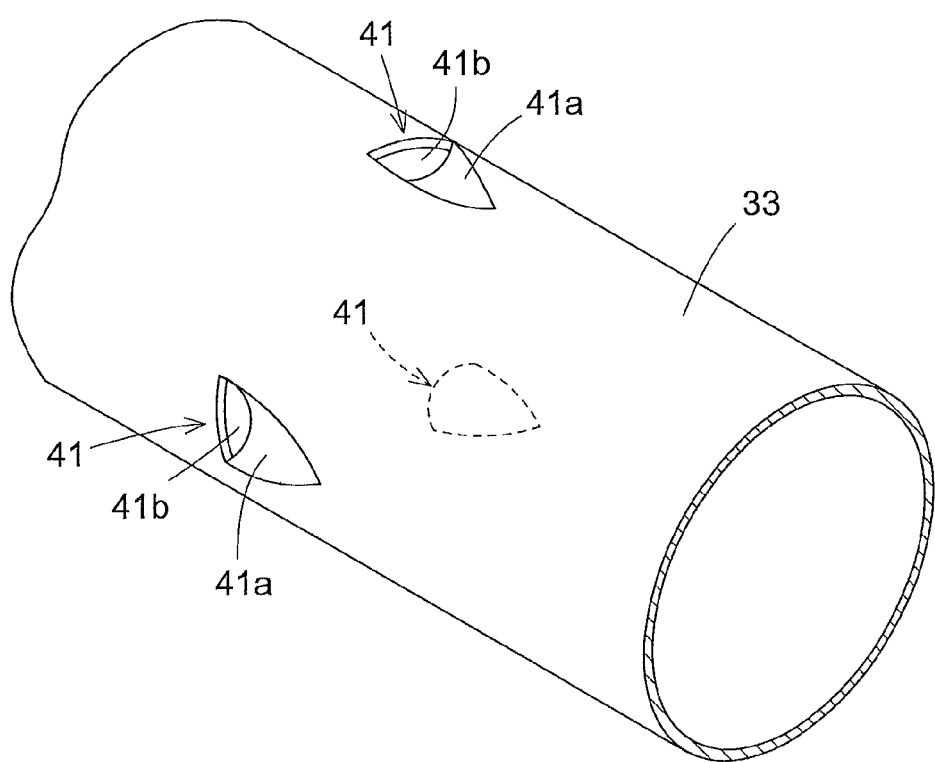
FIG. 8 is a perspective view of a downstream air intake.

More particularly, as shown in FIGS. 7 and 8, in the same manner as the upstream air intake 40, a cutout portion is formed in part of the mixing exhaust pipe 33 in the circumferential direction. Then, a circumferential wall portion of the pipe 33 in a position that is upstream of the cutout portion in the gas flowing direction is dented inwardly of the pipe, thereby to form a guide wall portion 41a. A downstream air drawing opening 41b is formed between a downstream end portion of the recessed guide wall portion 41a in the gas flowing direction and an arc circumferential wall of the mixing exhaust pipe 33, thereby to provide the downstream air intake 41. Three downstream air intakes 41 are equidistantly formed in the circumferential direction.

Figure 9A:
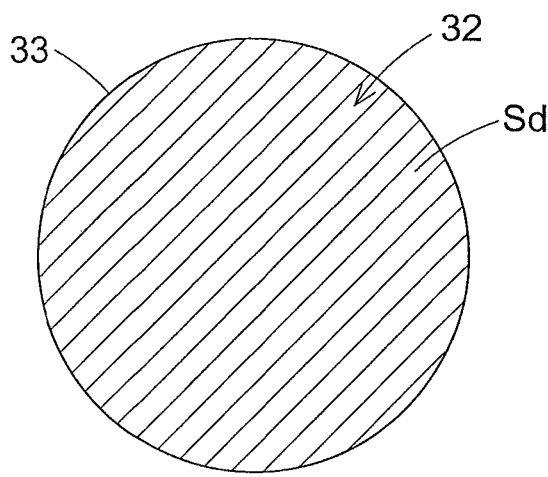
FIG. 9A shows a sectional area of a discharge opening.
Figure 9B:
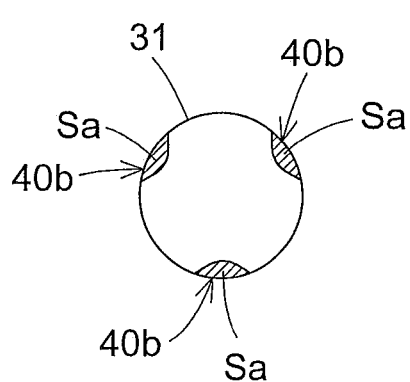
FIG. 9B shows sectional areas of upstream air drawing openings.
Figure 9C:
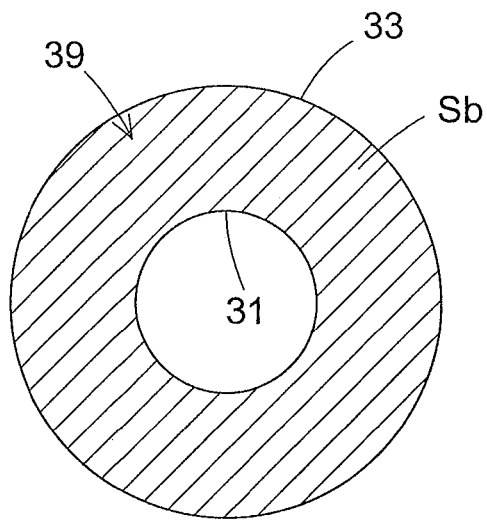
FIG. 9C shows a sectional area of air intake.
Figure 9D:
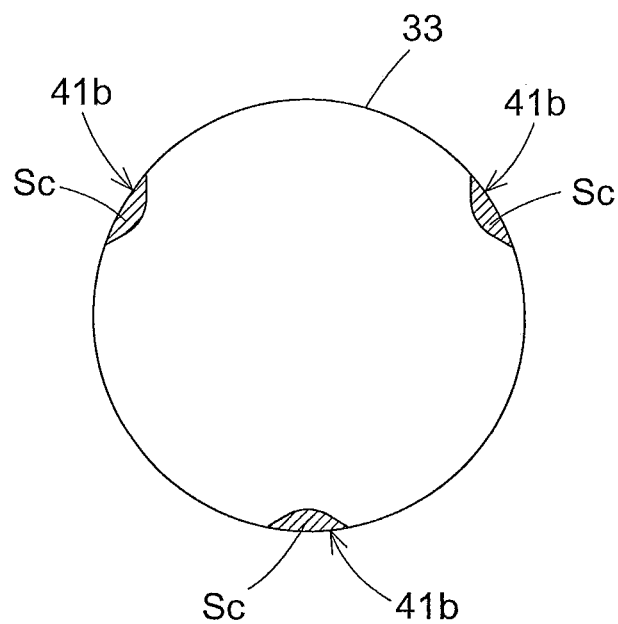
FIG. 9D shows sectional areas of downstream air drawing openings.

The discharge opening 32 of the mixing exhaust pipe 33 has a sectional area Sd (hatched portion in FIG. 9A) larger than a total sectional area of the sum of three sectional areas Sa of the upstream air drawing openings 40b (hatched portion in FIG. 9B), a sectional area Sb (hatched portion in FIG. 9C) of the air intake 39, and the sum of three sectional areas Sc of the downstream air drawing openings 41b (hatched portion in FIG. 9D).

With such an arrangement, the exhaust gas flowing through the exhaust pipe 31, ambient air drawn through the upstream air drawing openings 40b, ambient air drawn through the air intake 39, ambient air drawn through the downstream air drawing openings 41b are discharged to the outside without being accumulated in the discharge opening 32 of the mixing exhaust pipe 33, which allows ambient air to be taken in satisfactorily.

As a result, the high-temperature exhaust gas emitted from the exhaust gas purifying device 30 can be discharged to the outside with its temperature being sufficiently lowered as ambient air drawn through the upstream air drawing openings 40b, ambient air drawn through the air intake 39, and ambient air drawn through the downstream air drawing openings 41b, respectively, are mixed.

Second Embodiment

Figure 10:
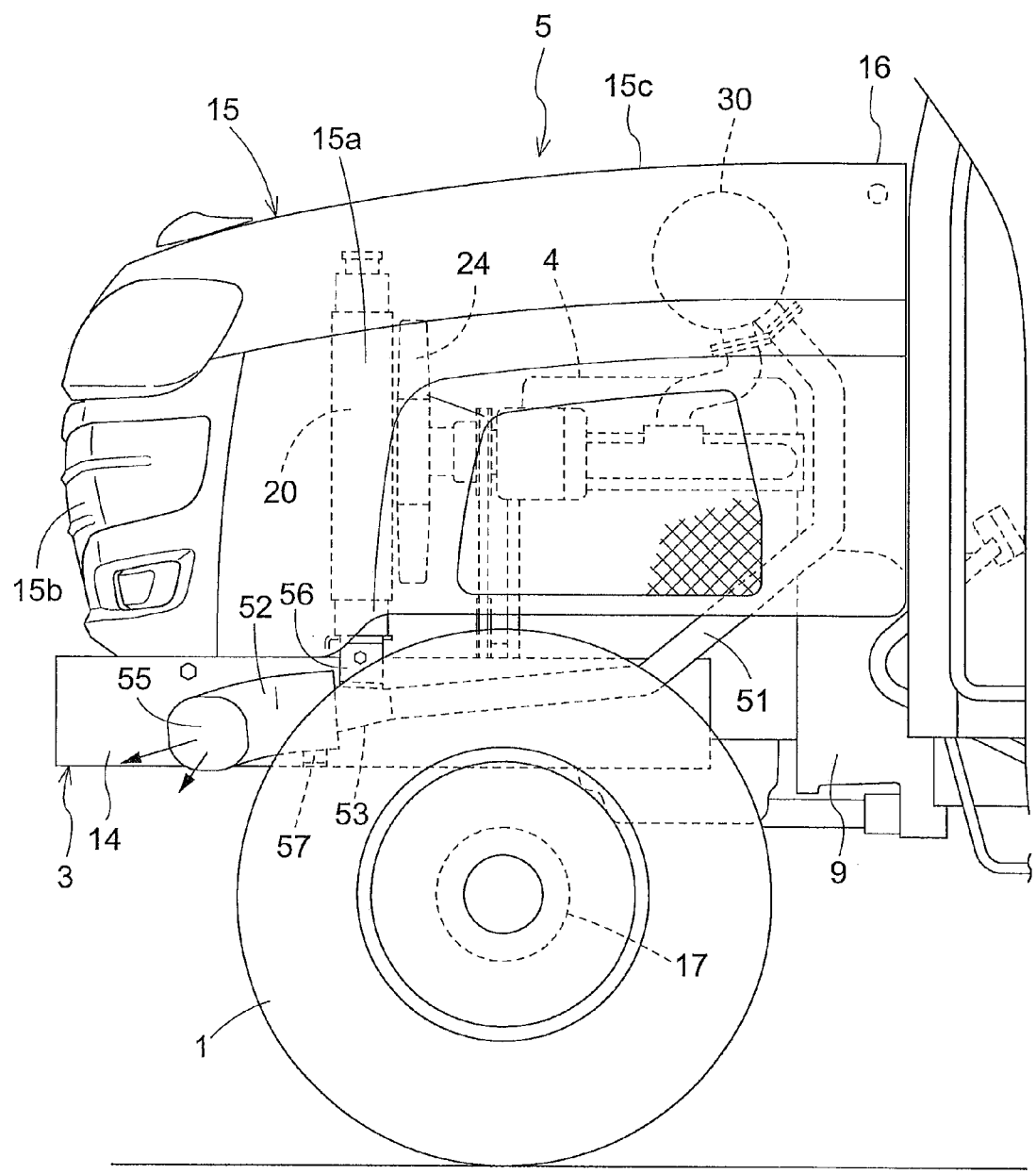
FIG. 10 is a side view of a hood.

A second embodiment shows a modified mode of the exhaust pipe and the mixing exhaust pipe of the first embodiment. The remaining arrangement is the same as that in the first embodiment. While descriptions of an exhaust pipe 51 and a mixing exhaust pipe 52 will be given hereinafter in reference to FIGS. 10 to 13, descriptions on the remaining arrangement will be omitted by making effective use of the same reference numbers as in the first embodiment. FIG. 10 is a side view of the hood, FIG. 11 is a side view of the motor section, FIG. 12 is a perspective view of the exhaust pipe and the mixing exhaust pipe, and FIG. 13 is a sectional view of the exhaust pipe and the mixing exhaust pipe.

Figure 11:
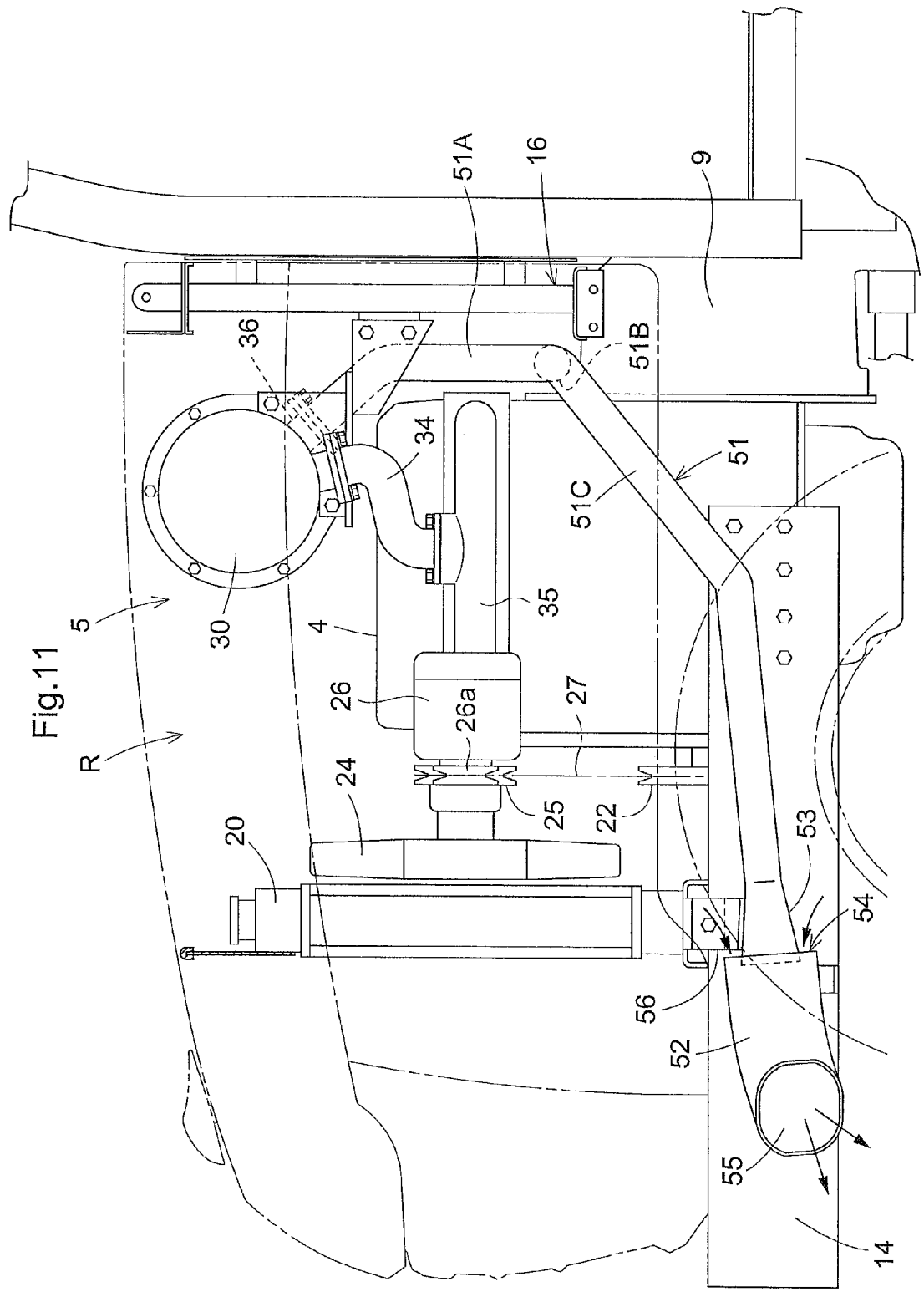
FIG. 11 is a side view of the motor section.

As shown in FIGS. 10 and 11, the exhaust pipe 51 includes a downward extending portion 51A, a transversely extending portion 51B, and a longitudinally extending portion 51C in the same manner as the first embodiment. This arrangement allows the exhaust pipe 51 to be connected to the end portion of an exhaust gas purifying device 50 on the right side in the vehicle width direction (the other side in the vehicle width direction) to extend toward the left in the vehicle width direction and overlap the mixing exhaust pipe 52 in the radial direction.

Figure 12:
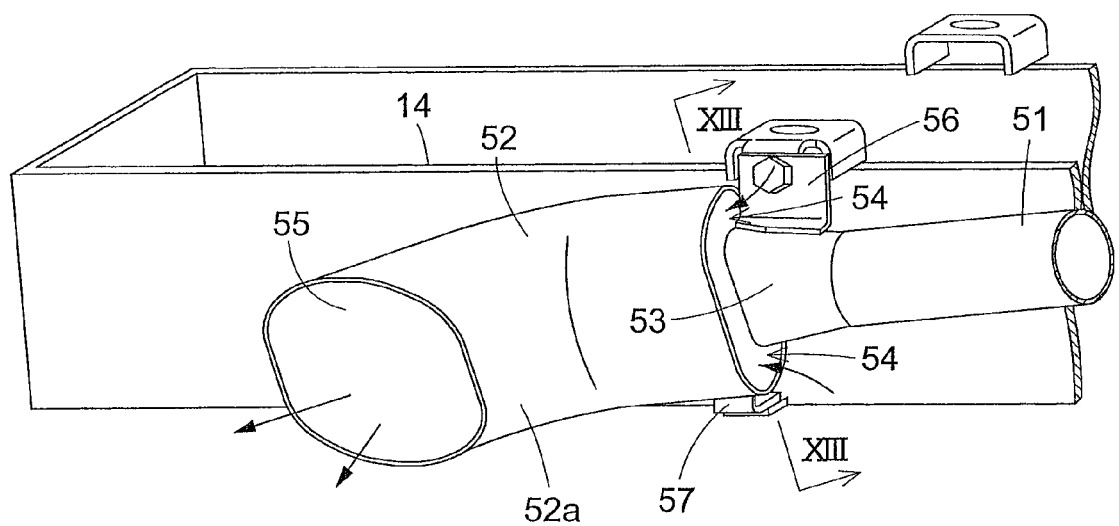
FIG. 12 is a perspective view of an exhaust pipe and the mixing exhaust pipe.
Figure 13:
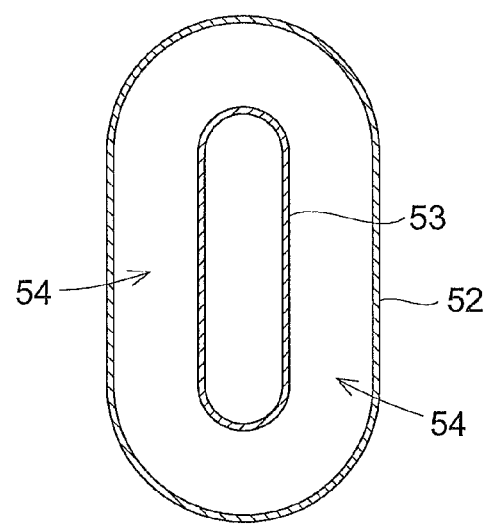
FIG. 13 is a sectional view of the exhaust pipe and the mixing exhaust pipe.

As shown in FIG. 12, a throttle portion 53 is provided in a front end portion (distal end portion) of the longitudinally extending portion 51C. The throttle portion 53 has a vertically elongated section having a width smaller than a width in the width direction in an upstream portion in the gas flowing direction. The exhaust pipe 51 is formed of a tube having a circular section. The portion of the tube having such a circular section is machined to provide the throttle portion 53 in the distal end portion of the exhaust pipe 51. More particularly, while the remaining portion of the exhaust pipe 51 other than the distal end portion maintains the circular section, only the distal end portion of the exhaust pipe 51 is machined to have the vertically elongated section with the width in the width direction being smaller than the width of the circular section.

The mixing exhaust pipe 52 is arranged on the lateral side of the front frame 14 in the similar manner to the first embodiment. As shown in FIGS. 12 and 13, the mixing exhaust pipe 52 has a vertically elongated section having a smaller width in the width direction in the same manner as the distal end portion of the exhaust pipe 51 to define a gap between an outer circumferential portion of the exhaust pipe 51 and an inner circumferential portion of the mixing exhaust pipe 52. The exhaust pipe 51 and the mixing exhaust pipe 52 are arranged such that the center of the exhaust pipe 51 in section is aligned with the center of the mixing exhaust pipe 52 in section (see FIG. 13). As a result, the gap is defined between the outer circumferential portion of the exhaust pipe 51 and the inner circumferential portion of the mixing exhaust pipe 52 over the entire circumference. The gap acts as an air intake 54 for taking in ambient air.

With the above-noted arrangement in which the throttle portion 53 is provided in the distal end portion of the exhaust pipe 51, the flowing speed of the exhaust gas emitted from the exhaust pipe 51 can be increased. This achieves a greater drawing force by the ejector effect of the exhaust gas discharged from the exhaust pipe 51 and supplied to the mixing exhaust pipe 52, and thus a larger amount of ambient air can be taken to the mixing exhaust pipe 52 through the air intake 54. In addition, since the air intake 54 is formed between the outer circumferential portion of the exhaust pipe 51 and the inner circumferential portion of the mixing exhaust pipe 52 over the entire circumference, a larger amount of ambient air can be taken to the mixing exhaust pipe 52. As a result, the exhaust gas can be sufficiently cooled by ambient air taken to the mixing exhaust pipe 52, which allows the mixing exhaust pipe 52 to be shortened. Further, since the throttle portion 53 is vertically elongated, the dimensions of the exhaust pipe 51 and the mixing exhaust pipe 52 in the width direction can be diminished. Therefore, the exhaust pipe 51 and the mixing exhaust pipe 52 are properly arranged even in the limited space defined in the lateral side of the front frame 14, while a larger amount of ambient air can be taken to the mixing exhaust pipe 52.

The positional arrangement of the mixing exhaust pipe 52 in the longitudinal direction of the vehicle body will be described next.

As shown in FIG. 10, the mixing exhaust pipe 52 is arranged so that a discharge opening 55 for discharging the exhaust gas is positioned to project forwardly of the front wheels 1. Further, the entire mixing exhaust pipe 52 is positioned forwardly of the front axle case 17. In this manner, the mixing exhaust pipe 52 is provided forwardly of the steerable front wheels 1. Thus, the mixing exhaust pipe 52 does not interfere with a steering operation of the front wheels 1 when the front wheels 1 are steered. In addition, since the discharge opening 55 of the mixing exhaust pipe 52 is positioned forwardly of the front wheels 1, the exhaust gas emitted from the discharge opening 55 is not discharged toward the front wheels 1 when the exhaust gas is discharged to a forward side from the mixing exhaust pipe 52, which increases the degree of freedom to choose the discharging direction of the exhaust gas. Further, it is possible to decrease the influence of the heat from the exhaust gas exercised on the operator on the driver's section 8 or the vehicle body.

A supporting structure for the exhaust pipe 51 will be described. As shown in FIGS. 11 and 12, the exhaust pipe 51 is supported to a first support member 56 fixedly connected to the lateral side portion of the front frame 14. The first support member 56 has a proximal end portion fixedly connected to the front frame 14 and extends downward from the connecting portion to be bent outwardly of the front frame 14 at a lower end portion thereof. The exhaust pipe 51 is connected to a distal end of the bent portion of the first support member 56.

A supporting structure for the mixing exhaust pipe 52 will be described. As shown in FIG. 12, the mixing exhaust pipe 52 is supported to a second support member 57 fixedly connected to the lateral side portion of the front frame 14. The second support member 57 extends laterally outward from the front frame 14, and is connected to a rear end portion of the mixing exhaust pipe 52. The second support member 57 connected to a front end portion of the mixing exhaust pipe 52 is not shown.

The discharging direction of the exhaust gas emitted from the discharge opening 55 of the mixing exhaust pipe 52 will be described.

As shown in FIG. 12, the mixing exhaust pipe 52 is formed as a tube having a vertically elongated section and is bent at an intermediate portion thereof obliquely downward in an outer side of the front frame 14. With such an arrangement, a portion of the mixing exhaust pipe 52 formed forwardly of the bent portion has a slanting portion 52*a* with its axis being directed forward in the vehicle longitudinal direction, directed outward in the vehicle width direction, and directed downward in the vehicle vertical direction. The discharge opening 55 is formed at a front end portion of the slanting portion 52*a*, through which the exhaust gas is discharged obliquely downward in the outer side with respect to the vehicle width direction in the forward portion of the vehicle body. The discharge opening 52 per se is formed to open outward of the vehicle width direction. The exhaust gas is guided by the slanting portion 52*a* of the mixing exhaust pipe 52 to be discharged obliquely downward in the outer side with respect to the vehicle width direction in the forward portion of the vehicle body.

Since the exhaust gas is discharged in such a direction in the mixing exhaust pipe 52, no dust is raised. Further, when a front loader is connected to the front portion of the vehicle body and a connecting member for connecting the front loader is provided outwardly of the mixing exhaust pipe 52 with respect to the vehicle width direction, it is possible to prevent the exhaust gas to be disadvantageously discharged from the mixing exhaust pipe 52 toward the connecting member.

Although FIGS. 10 to 13 do not show the upstream air drawing openings 40*b* and the downstream air drawing openings 41*b* of the first embodiment, those air drawing openings 40*b* and 41*b* may be provided. When those air drawing openings 40b and 41b are provided, the discharge opening 55 of the mixing exhaust pipe 52 may have a sectional area larger than a total sectional area of the sum of sectional areas of the upstream air drawing openings 40b, a sectional area of the air intake 54, and the sum of sectional areas of the downstream air drawing openings 41b in the similar manner to the first embodiment.

Alternatively, only the downstream air drawing openings 41b of the first embodiment may be provided in the second embodiment. In that case, the discharge opening 55 of the mixing exhaust pipe 52 may have a sectional area larger than a total sectional area of a sectional area of the air intake 54 and the sum of sectional areas of the downstream air drawing openings 41b.

Other Modified Embodiments

[1] In the first and second embodiments described above, the exhaust pipe 33 or 52 is arranged in the lower side position on the left side in the vehicle width direction. Instead, the exhaust pipe 33 or 52 may be arranged in the lower side position on the right side in the vehicle width direction.

[2] In the first embodiment described above, the mixing exhaust pipe 33 is positioned above the front axle case 17. Instead, the mixing exhaust pipe 33 may be mounted in a position other than the position above the front axle case 17.

In the second embodiment described above, the mixing exhaust pipe 52 is provided forwardly of the front wheels 1. Instead, the mixing exhaust pipe 52 may be positioned above the front axle case 17, for example. In this manner, the position of the mixing exhaust pipe 52 may vary appropriately.

[3] In the first embodiment described above, the upstream air drawing openings 40b are formed in the exhaust pipe 31. Instead, those air drawing openings 40b are dispensable. In that case, the discharge opening 32 of the mixing exhaust pipe 33 would have a sectional area Sd larger than a total sectional area of a sectional area Sb of the air intake 39 and the sum of sectional areas Sc of the downstream air drawing openings 41b. Here, in the portion where the exhaust pipe 31 overlaps the mixing exhaust pipe 33, ambient air is drawn from the air intake 39 formed between the smaller-diameter exhaust pipe 31 and the larger-diameter mixing exhaust pipe 33. Ambient air is also drawn in the positions where the air drawing openings 41b are provided. More particularly, the exhaust gas is mixed with ambient air drawn from the air intake 39 to lower the temperature of the gas, and then further mixed with ambient air drawn from the air drawing openings 41b to further lower the temperature of the gas. Since the discharge opening 32 has the sectional area larger than the total sectional area of the sectional area of the air intake 39 and the sum of the sectional areas of the air drawing openings 41b, the exhaust air can be discharged to the outside without being accumulated in the discharge opening 32 even if ambient air is drawn from the air intake 39 and from the air drawing openings 41b, respectively. As a result, ambient air can be taken in satisfactorily from the air intake 39 and the air drawing openings 41b, which allows the high-temperature exhaust gas emitted from the exhaust gas purifying device 30 to be discharged to the outside from the discharge opening 32 with its temperature being lowered sufficiently.

[4] In the first embodiment described above, while the downstream air drawing openings 41b are formed in the mixing exhaust pipe 33, such downstream air drawing openings 41b are dispensable.

[5] In the first and second embodiments described above, while the work vehicle includes the cabin C, such a cabin C is dispensable.

What is claimed is:

1. A work vehicle comprising:
a motor section positioned forwardly of a driver's section in a vehicle body; and
an exhaust apparatus including
an exhaust gas purifying device mounted on the motor section such that the exhaust gas purifying device is disposed in a portion of the motor section rearwardly of the vehicle body, the exhaust gas purifying device being aligned with a direction of a width of the vehicle body and configured to purify exhaust gas of an engine,
an exhaust pipe, through which the exhaust gas discharged from the exhaust gas purifying device flows, the exhaust pipe having an upstream end portion thereof in a gas flowing direction connected to a rear side of the exhaust gas purifying device, and a downstream end portion thereof in the gas flowing direction disposed forwardly of the exhaust gas purifying device, and the exhaust pipe comprising: a first extending portion extending rearward from the rear side of the exhaust gas purifying device; a second extending portion bent from a rear end portion of the first extending portion in an L-letter shape and extending therefrom in the direction of the width of the vehicle body; and a third extending portion bent from an end portion of the second extending portion remote from the first extending portion and extending forward therefrom, and
a mixing exhaust pipe having a discharge opening and formed as a tube larger than the exhaust pipe in diameter with overlapping a distal end portion of the exhaust pipe in a radial direction, the mixing exhaust pipe drawing ambient air by the exhaust gas emitted from the exhaust pipe, mixing the exhaust gas with drawn ambient air, and discharging the mixed gas to the outside from the discharge opening, the mixing exhaust pipe being arranged in a lower side position of the motor section on one side of the direction of the width of the vehicle body with its axis extending along a longitudinal direction of the vehicle body and with the exhaust gas being discharged toward the front of the vehicle body, and the exhaust pipe being connected to an end portion of the exhaust gas purifying device on the other side of the direction of the width of the vehicle body to extend toward the one side of the direction of the width of the vehicle body and overlapping the mixing exhaust pipe in the radial direction.

2. The work vehicle as defined in claim 1, wherein an air drawing opening is formed in a portion of the mixing exhaust pipe that is a downstream side of the position where the mixing exhaust pipe overlaps the exhaust pipe and an upstream side of the discharge opening in the gas flowing direction, for drawing ambient air through the exhaust gas flowing in the exhaust pipe, and
wherein the discharge opening has a sectional area larger than a total sectional area of a sectional area of an air intake formed in a portion where an extreme end of the exhaust pipe overlaps an extreme end of the mixing exhaust pipe and a sectional area of the air drawing opening.

3. The work vehicle as defined in claim 1, wherein a throttle portion is provided in a front end portion of the exhaust pipe, the throttle portion having a vertically elongated section having a width smaller than a width in the direction of the width of the vehicle body in an upstream portion in the gas flowing direction.

4. The work vehicle as defined in claim 1, wherein the mixing exhaust pipe is disposed forwardly of steerable front wheels.

5. The work vehicle as defined in claim 1, wherein the mixing exhaust pipe is adapted to discharge the exhaust gas obliquely downward in an outer side with respect to the direction of the width of the vehicle body in a forward portion of the vehicle body.

6. A work vehicle comprising:
a motor section positioned forwardly of a driver's section in a vehicle body; and
an exhaust apparatus including:
an exhaust gas purifying device mounted on the motor section configured to purify exhaust gas of an engine such that the exhaust gas purifying device is disposed in a portion of the motor section rearwardly of the vehicle body, the exhaust gas purifying device being aligned with a direction of a width of the vehicle body and,
an exhaust pipe, through which the exhaust gas discharged from the exhaust gas purifying device flows, the exhaust pipe having an upstream end portion thereof in a gas flowing direction connected to a rear side of the exhaust gas purifying device, and a downstream end portion thereof in the gas flowing direction disposed forwardly of the exhaust gas purifying device, and the exhaust pipe comprising: a first extending portion extending rearward from the rear side of the exhaust gas purifying device; a second extending portion bent from a rear end portion of the first extending portion in an L-letter shape and extending therefrom in the direction of the width of the vehicle body; and a third extending portion bent from an end portion of the second extending portion remote from the first extending portion and extending forward therefrom, and
a mixing exhaust pipe disposed above a front axle case for supporting steerable front wheels and having a discharge opening, the mixing exhaust pipe being formed as a tube larger than the exhaust pipe in diameter with overlapping a distal end portion of the exhaust pipe in a radial direction, the mixing exhaust pipe drawing ambient air by the exhaust gas emitted from the exhaust pipe, mixing the exhaust gas with drawn ambient air, and discharging the mixed gas to the outside from the discharge opening, and the mixing exhaust pipe being arranged in a lower side position of the motor section on one side of the direction of the width of the vehicle body with its axis extending along a longitudinal direction of the vehicle body and with the exhaust gas being discharged toward the front of the vehicle body.

7. The work vehicle as defined in claim 6, wherein an air drawing opening is formed in a portion of the mixing exhaust pipe that is a downstream side of the position where the mixing exhaust pipe overlaps the exhaust pipe and an upstream side of the discharge opening in the gas flowing direction, for drawing ambient air through the exhaust gas flowing in the exhaust pipe, and
wherein the discharge opening has a sectional area larger than a total sectional area of a sectional area of an air intake formed in a portion where an extreme end of the exhaust pipe overlaps an extreme end of the mixing exhaust pipe and a sectional area of the air drawing opening.

8. The work vehicle as defined in claim 6, wherein a throttle portion is provided in a front end portion of the exhaust pipe, the throttle portion having a vertically elongated section having a width smaller than a width in the direction of the width of the vehicle body in an upstream portion in the gas flowing direction.

9. The work vehicle as defined in claim 6, wherein the mixing exhaust pipe is disposed forwardly of steerable front wheels.

10. The work vehicle as defined in claim 6, wherein the mixing exhaust pipe is adapted to discharge the exhaust gas obliquely downward in an outer side with respect to the direction of the width of the vehicle body in a forward portion of the vehicle body.

11. A work vehicle comprising:
a motor section positioned forwardly of a driver's section in a vehicle body; and
an exhaust apparatus including:
an exhaust gas purifying device mounted on the motor section such that the exhaust gas purifying device is disposed in a portion of the motor section rearwardly of the vehicle body, the exhaust gas purifying device being aligned with a direction of a width of the vehicle body and configured to purify exhaust gas of an engine,
an exhaust pipe, through which the exhaust gas discharged from the exhaust gas purifying device flows, the exhaust pipe having an upstream end portion thereof in a gas flowing direction connected to a rear side of the exhaust gas purifying device, and a downstream end portion thereof in the gas flowing direction disposed forwardly of the exhaust gas purifying device, and the exhaust pipe comprising: a first extending portion extending rearward from the rear side of the exhaust gas purifying device; a second extending portion bent from a rear end portion of the first extending portion in an L-letter shape and extending therefrom in the direction of the width of the vehicle body; and a third extending portion bent from an end portion of the second extending portion remote from the first extending portion and extending forward therefrom, and
a mixing exhaust pipe disposed above a front axle case for supporting steerable front wheels and having a discharge opening, the mixing exhaust pipe being formed as a tube larger than the exhaust pipe in diameter with overlapping a distal end portion of the exhaust pipe in a radial direction, the mixing exhaust pipe drawing ambient air by the exhaust gas emitted from the exhaust pipe, mixing the exhaust gas with drawn ambient air, and discharging the mixed gas to the outside from the discharge opening, the mixing exhaust pipe being arranged in a lower side position of the motor section on one side of the direction of the width of the vehicle body with its axis extending along a longitudinal direction of the vehicle body and with the exhaust gas being discharged toward the front of the vehicle body, and the exhaust pipe being connected to an end portion of the exhaust gas purifying device on the other side of the direction of the width of the vehicle body to extend toward the one side of the direction of the width of the vehicle body and overlapping the mixing exhaust pipe in the radial direction.

12. The work vehicle as defined in claim 11, wherein an air drawing opening is formed in a portion of the mixing exhaust pipe that is a downstream side of the position where the mixing exhaust pipe overlaps the exhaust pipe and an upstream side of the discharge opening in the gas flowing direction, for drawing ambient air through the exhaust gas flowing in the exhaust pipe, and wherein the discharge opening has a sectional area larger than a total sectional area of a sectional area of an air intake formed in a portion where an extreme end of the exhaust pipe overlaps an extreme end of the mixing exhaust pipe and a sectional area of the air drawing opening.

13. The work vehicle as defined in claim 11, wherein a throttle portion is provided in a front end portion of the exhaust pipe, the throttle portion having a vertically elongated section having a width smaller than a width in the direction of the width of the vehicle body in an upstream portion in the gas flowing direction.

14. The work vehicle as defined in claim 11, wherein the mixing exhaust pipe is disposed forwardly of steerable front wheels.

15. The work vehicle as defined in claim 11, wherein the mixing exhaust pipe is adapted to discharge the exhaust gas obliquely downward in an outer side with respect to the direction of the width of the vehicle body in a forward portion of the vehicle body.

* * * * *